United States Patent
Shikanai et al.

(10) Patent No.: US 10,081,407 B2
(45) Date of Patent: Sep. 25, 2018

(54) SADDLE TYPE VEHICLE

(71) Applicant: HONDA MOTOR CO., LTD., Tokyo (JP)

(72) Inventors: Shinpei Shikanai, Wako (JP); Koichi Nozoe, Wako (JP); Ikuma Harada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 169 days.

(21) Appl. No.: 14/845,586

(22) Filed: Sep. 4, 2015

(65) Prior Publication Data
US 2016/0090145 A1 Mar. 31, 2016

(30) Foreign Application Priority Data
Sep. 26, 2014 (JP) ................. 2014-197015

(51) Int. Cl.
| | |
|---|---|
| *B62K 21/12* | (2006.01) |
| *B62K 23/06* | (2006.01) |
| *B62L 3/02* | (2006.01) |
| *B60T 7/10* | (2006.01) |
| *B62J 6/00* | (2006.01) |
| *G05G 1/04* | (2006.01) |
| *B62K 11/04* | (2006.01) |

(52) U.S. Cl.
CPC ............ *B62K 23/06* (2013.01); *B60T 7/104* (2013.01); *B62J 6/00* (2013.01); *B62K 11/04* (2013.01); *B62K 21/12* (2013.01); *B62L 3/02* (2013.01); *B62L 3/023* (2013.01); *G05G 1/04* (2013.01)

(58) Field of Classification Search
CPC ........ B62K 23/06; B62K 23/02; B62K 21/12; B62J 6/00
USPC .................................... 280/263, 264
See application file for complete search history.

(56) References Cited

U.S. PATENT DOCUMENTS

| | | | | |
|---|---|---|---|---|
| 2010/0307856 A1* | 12/2010 | Hahn | .................. | B60K 23/02 180/333 |
| 2012/0304805 A1* | 12/2012 | Higashijima | .......... | B62K 11/14 74/551.8 |
| 2013/0307678 A1* | 11/2013 | Ransom | .................. | B62J 6/005 340/432 |
| 2015/0020638 A1* | 1/2015 | Oakes | .................. | B62K 23/06 74/490.15 |

FOREIGN PATENT DOCUMENTS

| | | | |
|---|---|---|---|
| JP | 2010070131 A | * | 4/2010 |
| JP | 5150431 B2 | | 12/2012 |

* cited by examiner

*Primary Examiner* — Jacob D Knutson
(74) *Attorney, Agent, or Firm* — Birch, Stewart, Kolasch & Birch, LLP

(57) ABSTRACT

A saddle type vehicle includes a parking operator for allowing the lever to be lengthened without affecting the surrounding members. A parking lever is arranged more forward than the tip of a first finger of an operator when the first finger is fully extended forward. Therefore, there is no concern that the hand holding the left grip section may touch the parking lever. Thus, the lever can be sufficiently lengthened. In addition, the parking lever is sufficiently far from the grip section toward the vehicle front. As a result, there is no concern that the parking lever may interfere with a normal gripping operation. In addition, a handle switch or other part can be readily arranged on a switch box on the base portion of the grip section without being affected by the parking lever.

16 Claims, 10 Drawing Sheets

SADDLE TYPE VEHICLE

CROSS-REFERENCE TO RELATED APPLICATIONS

The present application claims priority under 35 USC 119 to Japanese Patent Application No. 2014-197015 filed Sep. 26, 2014 the entire contents of which are hereby incorporated by reference.

BACKGROUND OF THE INVENTION

1. Field of the Invention

The present invention relates to a saddle type vehicle including a parking operator on a handle bar.

2. Description of Background Art

Some commercially available saddle type vehicles include a parking brake adapted to apply braking pressure to the wheels during parking in addition to a brake adapted to apply braking pressure to the wheels during driving. It is known to use a parking brake that is operated by using a parking operator. See, for example, FIG. 2 in Japanese Patent No. 5150431.

As illustrated in FIG. 2 of Japanese Patent No. 5150431, a second manual operator, a parking lever (15) (the number in parenthesis represents the reference numeral used in Japanese Patent No. 5150431; the same applies hereinafter) corresponding to a parking lever is attached to a handle bar (11) by means of a second shaft (14) in a freely swingable manner.

When the folded parking lever (15) is rotated manually counterclockwise about 180 degrees, a parking brake wire (22) is loosened, thus deactivating the parking brake (causing the wheels to be unbraked).

If a request is made to reduce the operating force, what is taken into consideration is to lengthen the parking lever (15). Because of the principle of leverage, the longer the parking lever (15), the smaller the operating force. On the other hand, it is necessary to secure a space for that purpose near the handle grip. This affects the surrounding members including a reduced space for arranging and operating other members. As a result, it is structurally difficult to lengthen the folded parking lever (15).

Against the backdrop of a further need to reduce the operating force, however, a structure is needed which allows the lever to be lengthened without affecting the surrounding members.

SUMMARY AND OBJECTS OF THE INVENTION

According to an embodiment of the present invention, a saddle type vehicle is provided that includes a parking operator that allows the lever to be lengthened without affecting the surrounding members.

According to an embodiment of the present invention, a saddle type vehicle is provided that has a steering handle bar that includes a parking operator adapted to activate a parking brake during parking.

The handle bar has a grip section on its end portion. A lever bracket is provided on the base portion of the grip section. A holding section is provided on an area of the lever bracket more toward the vehicle front than the handle bar to hold a parking lever serving as the parking operator.

The parking lever provided on the holding section is arranged longitudinally far from the grip section so that when a first finger extends forward from the state of holding the grip section, the fingertip does not reach the parking lever.

According to an embodiment of the present invention, a switch box is provided on the handle bar between the grip section and the lever bracket. The parking lever has a curved portion to avoid interference with the switch box.

According to an embodiment of the present invention, a lever lock mechanism is provided between the parking lever and the lever bracket to restrict the return of the parking lever when the parking brake is activated. The lever lock mechanism includes a lock lever and a stopper member. The lock lever is provided on the parking lever in a swingable manner. The stopper member is provided on the lever bracket to engage with the lock lever.

According to an embodiment of the present invention, a knuckle visor is arranged forward of the parking lever to protect the grip section. One end of the knuckle visor is fastened to the lever bracket together with the parking lever.

According to an embodiment of the present invention, a meter case is provided forward of the handle bar. A parking switch is provided on the lever bracket to detect the position of the parking lever. A parking brake lamp or an indicator adapted to show the parking status is provided on the meter case. The lamp or indicator is illuminated or goes out on the basis of information from the parking switch.

According to an embodiment of the present invention, a parking lever is arranged longitudinally far from the grip section so that when the first finger extends forward from the state of holding the grip section, the fingertip does not reach the parking lever. The parking lever can extend along the grip section to a sufficient length. In addition, the parking lever is sufficiently away from the grip section toward the vehicle front. As a result, there is no concern that the parking lever may interfere with a normal gripping operation. In addition, a handle switch or other part can be readily arranged on a switch box on the base portion of the grip section without being affected by the parking lever.

According to an embodiment of the present invention, a saddle type vehicle is provided that includes a parking operator that allows the lever to be lengthened without affecting the surrounding members.

According to an embodiment of the present invention, a switch box is provided between the grip section and the lever bracket. The parking lever has curved portions to avoid interference with the switch box. This makes it possible to secure a switch space for the switch box while at the same time preventing interference with the switch box, thus contributing to improved ease of use of the switch box.

According to an embodiment of the present invention, a holding mechanism of the parking lever includes a lock lever and a stopper member. The lock lever is provided on the parking lever in a swingable manner. The stopper member is provided on the lever bracket. The return of the parking lever can be restricted using the parking lever and the lever bracket, thus providing a holding mechanism having a simpler structure and contributing to lighter and less expensive holding mechanism.

According to an embodiment of the present invention, a knuckle visor is arranged forward of the parking lever to protect the grip section. One end of the knuckle visor is fastened to the lever bracket together with the parking lever. Because the knuckle visor is fastened together with the parking lever, there is no relative position deviation between the knuckle visor and the parking lever, thus making it possible to bring them close to each other with no interference therebetween. This saves assembly parts, reduces assembly man-hours, and contributes to a smaller knuckle visor.

Further, the parking lever is housed in the knuckle visor as seen in a plan view, thus providing improved appearance.

According to an embodiment of the present invention, a meter case is provided forward of the handle bar. A parking switch is provided on the lever bracket to detect the position of the parking lever. A parking brake lamp or an indicator adapted to show the parking status is provided on the meter case. The lamp or indicator is illuminated or goes out on the basis of information from the parking switch. This allows the driver to visually recognize the parking brake condition in the same manner as he or she views the meter. The parking switch is attached to the lever bracket, thus making it possible to economize on other members such as switch bracket.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
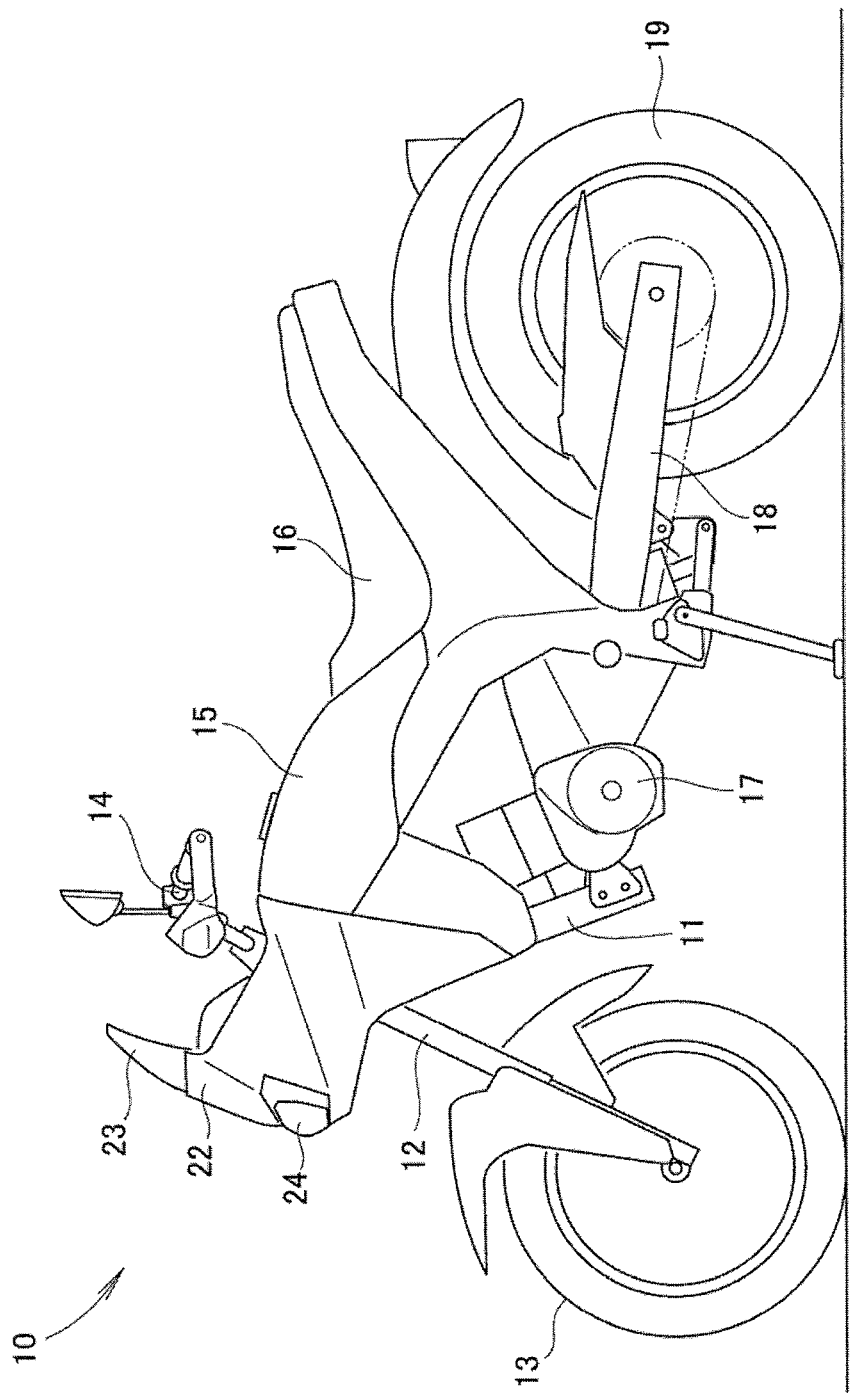
FIG. 1 is a left side view of a saddle type vehicle.

A description will be given below of an embodiment of the present invention with reference to the accompanying drawings. Note that the diagrams should be viewed in the direction of the reference numerals.

As illustrated in FIG. 1, a saddle type vehicle 10 includes a front fork 12, a front wheel 13, a handle bar 14, a fuel tank 15 and a seat 16, an engine 17, a swing arm 18, a rear wheel 19, a front cowl 22, a screen 23, and a headlight 24. The front fork 12 is steerably attached to the front portion of a vehicle body frame 11. The front wheel 13 is attached to the lower portion of the front fork 12 in a freely rotatable manner. The steering handle bar 14 is attached to the upper portion of the front fork 12. The fuel tank 15 and the seat 16 are arranged rearward of the handle bar 14 in this order and supported by the vehicle body frame 11. The engine 17 is arranged under the fuel tank 15 and supported by the vehicle body frame 11. The swing arm 18 extends rearward from the vehicle body frame 11. The rear wheel 19 is attached to the swing arm 18 in a freely rotatable manner. The front cowl 22 is arranged forward of the fuel tank 15 in such a manner so as to surround the front fork 12. The screen 23 is attached to the upper portion of the front cowl 22. The headlight 24 is attached to the front portion of the front cowl 22. The saddle type vehicle 10 is ridden by straddling the seat 16.

Figure 2:
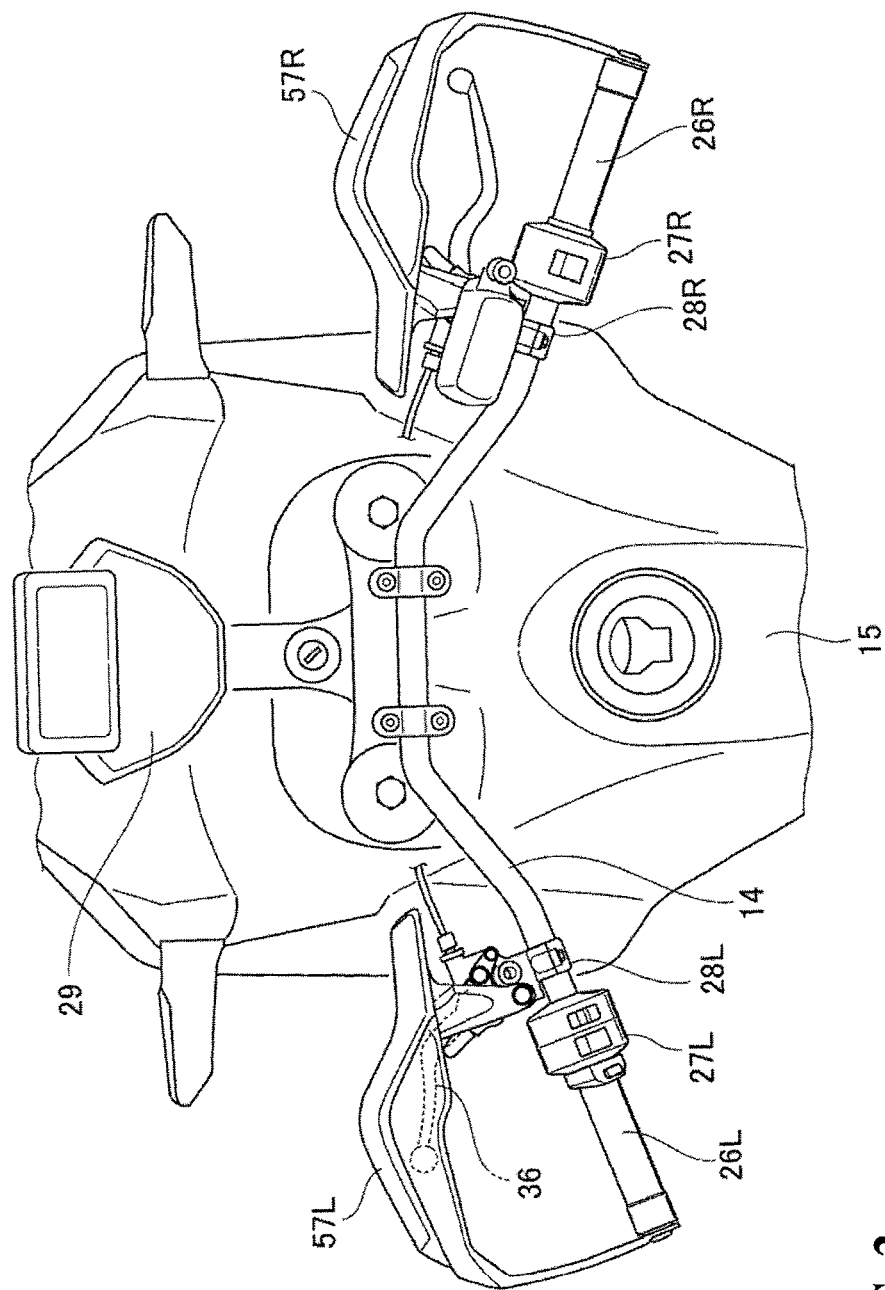
FIG. 2 is a plan view near a handle bar.

As illustrated in FIG. 2, a left grip section 26L (L is a subscript representing left; the same applies hereinafter), a left switch box 27L, and a left lever bracket 28L, are attached to the left end portion of the handle bar 14 from the tip to the vehicle body center. A right grip section 26R for acceleration (R is a subscript representing right; the same applies hereinafter), a right switch box 27R, and a right lever bracket 28R, are attached to the right end portion of the handle bar 14 from the tip to the vehicle body center. A meter case 29 is arranged forward of the handle bar 14 on the vehicle and at the center along the vehicle width.

A description will be given below of the detailed structure of the area near the left grip section 26L.

Figure 3:
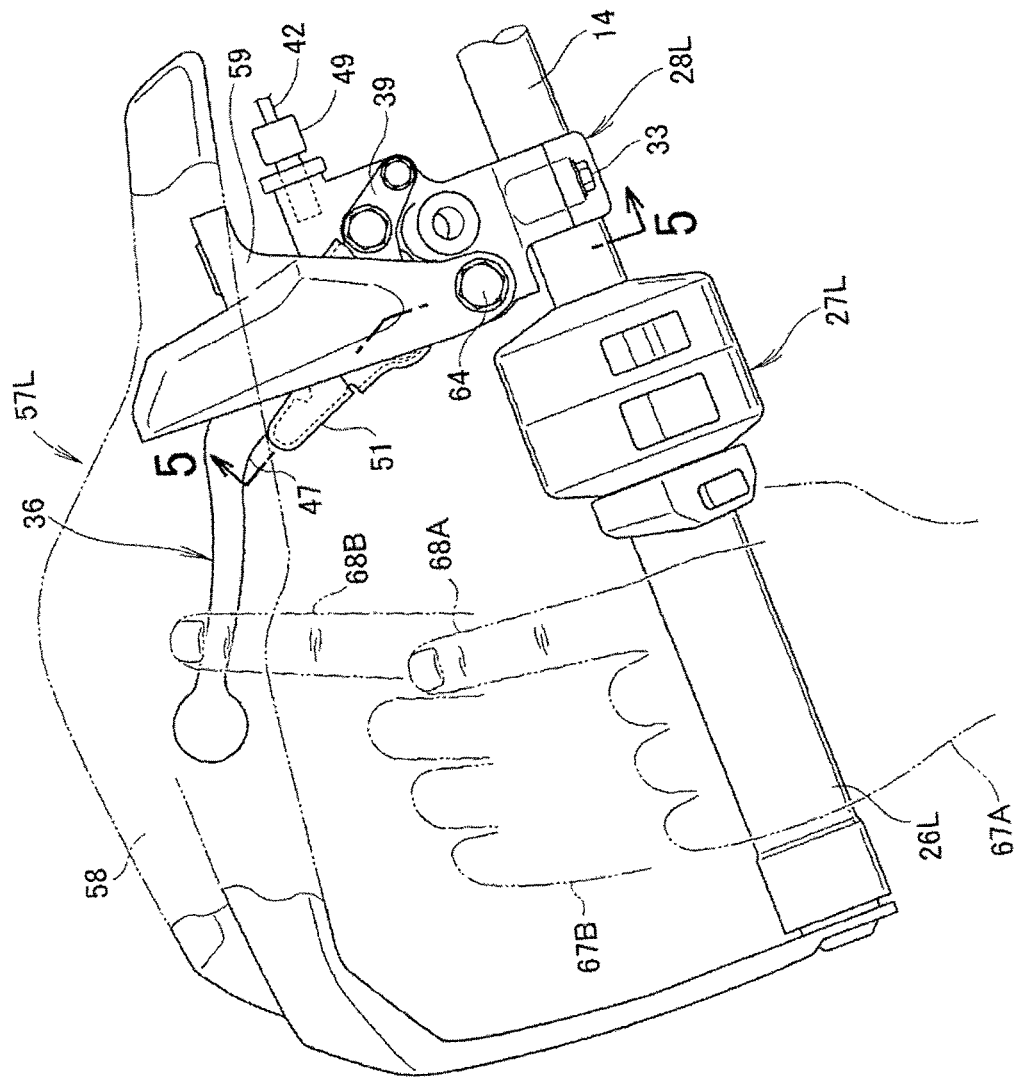
FIG. 3 is an enlarged view of the area near a left grip section.
Figure 4:
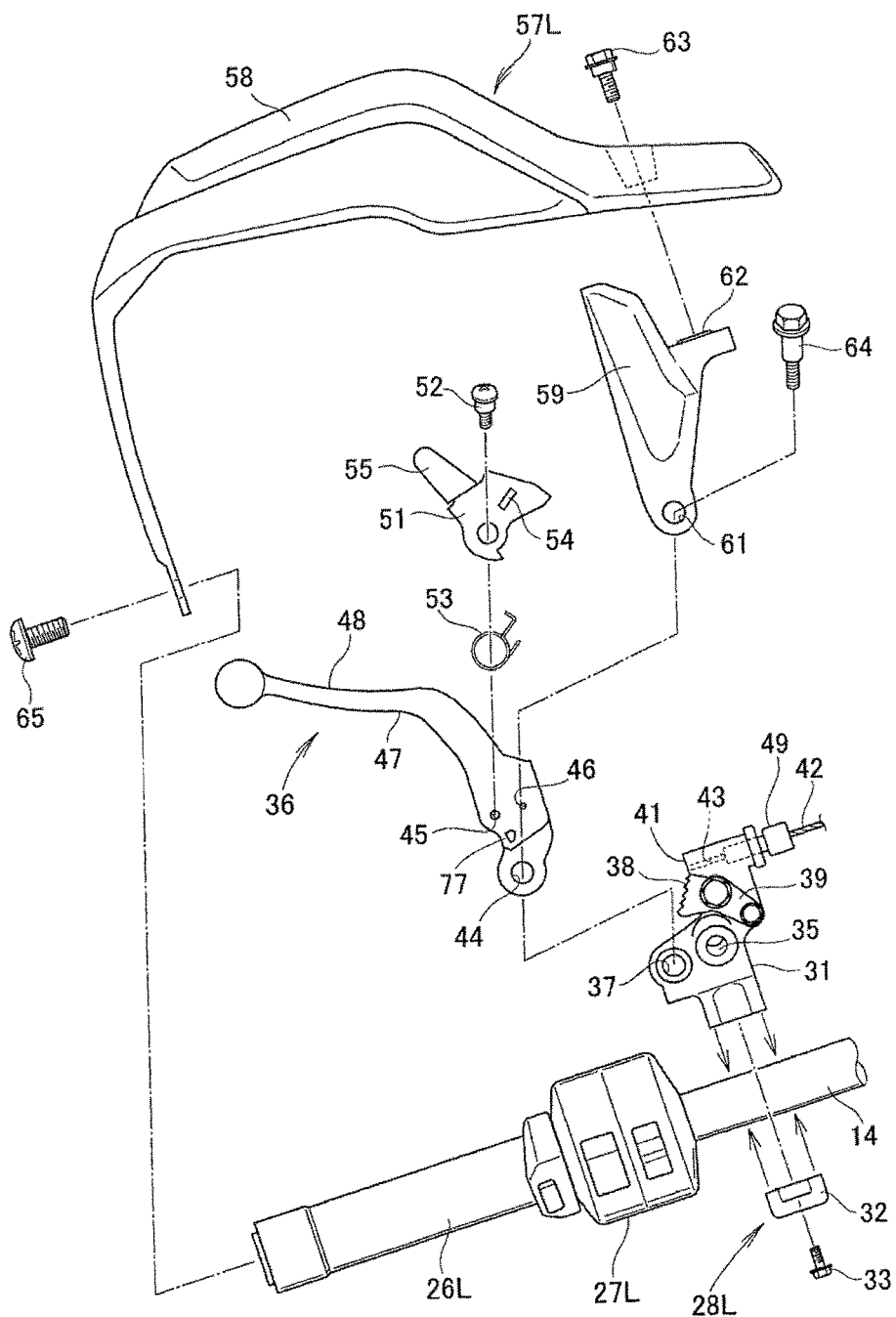
FIG. 4 is an exploded view of a parking operator.

FIG. 3 is an enlarged view of the area near the left grip section 26L. FIG. 4 is an exploded view thereof.

As illustrated in FIG. 4, the left grip section 26L is attached to the left end portion of the handle bar 14. The left switch box 27L is attached to the handle bar 14 on the side of the vehicle body center of the left grip section 26L. The left lever bracket 28L is attached to the handle bar 14 on the side of the vehicle body center of the left switch box 27L.

The left lever bracket 28L includes a bracket main body 31 and a cap 32. The left lever bracket 28L can be detached from the handle bar 14 by removing a bolt 33.

A left rear mirror attachment section 35 and a holding section 37 of a parking lever 36 are provided on the bracket main body 31. The holding section 37 is located more forward on the vehicle than the handle bar 14.

Further, a stopper member 39, having a sawtooth section 38, is attached to the bracket main body 31. Near the stopper member 39, a receiving face 41 is formed to receive the parking lever 36, and a wire guide section 43 is provided to guide a parking brake wire 42.

Still further, a parking wire adjustment screw 49 is screwed into the bracket main body 31 to adjust the tension of the parking brake wire 42.

The parking lever 36 has a shape similar to an ordinary clutch lever or left brake lever and is a long lever member which is approximately as long as the left grip section 26L. The parking lever 36 has a pin hole 44 at one end and a female threaded section 45, a spring clamping hole 46, and first and second curved portions 47 and 48 on the way to the other end. The parking lever 36 is sufficiently long, thus making it possible to keep the operating force required to swing the parking lever 36 sufficiently small.

It should be noted that the second curved portion 48 is designed so that when the parking lever 36 is pulled, the tip portion of the parking lever 36 is approximately parallel with the left grip section 26L, thus providing sufficient lever stroke.

A screw or a pivot bolt 52 is screwed into the female threaded section 45 to secure a lock lever 51. At this time, one end of a torsion spring 53 is inserted into the spring clamping hole 46, and the other end thereof is pressed against a spring receiver 54 so that the torsion spring 53 spans between the parking lever 36 and the lock lever 51. The lock lever 51 includes a finger placement section 55.

Further, a left knuckle visor 57L is attached to the left grip section 26L. The left knuckle visor 57L is a member adapted to protect the left grip section 26L in such a manner so as to surround the left grip section 26L from front. The right grip section 26R (FIG. 2) is similarly protected by a right knuckle visor 57R.

In the present example, the left knuckle visor 57L includes an L-shaped knuckle visor main body 58 and an I-shaped guard stay 59, with a pin hole 61 and a female threaded section 62 provided in the guard stay 59.

The knuckle visor main body 58 is combined into one piece with the guard stay 59 by means of a screw 63 screwed into the female threaded section 62 of the guard stay 59. The knuckle visor main body 58 and the guard stay 59 can be monolithically molded without separating them. However, if the knuckle visor main body 58 and the guard stay 59 are fabricated separately as in the present example, different materials can be used, thus making it possible to form the knuckle visor main body 58 in a more complicated shape and providing a molding die with a simpler structure.

The guard stay 59 and the parking lever 36 are fastened together to the bracket main body 31 by passing a pin screw 64 through the pin hole 61 of the guard stay 59 and the pin hole 44 of the parking lever 36 and screwing the pin screw 64 into the holding section 37 of the bracket main body 31.

The other end of the knuckle visor main body 58 is secured to the other end (left tip) of the handle bar 14 with a screw 65.

FIG. 3 shows how the area near the left grip section 26L looks when the assembly is complete.

The tension of the parking brake wire 42 can be adjusted by turning the parking wire adjustment screw 49. More specifically, a parking brake adjustment mechanism is provided on the side of the handle bar 14, thus allowing for easy adjustment close at hand and providing improved ease of use.

An imaginary line 67A represents a hand holding the left grip section 26L. At this time, the parking lever 36 is arranged more forward than the tip of a first finger 68A that is fully extended forward. Therefore, there is no concern that the hand 67A holding the left grip section 26L may touch the parking lever 36.

An imaginary line 67B represents a hand with its palm extended. At this time, the tip of a first finger 68B that is fully extended forward reaches the parking lever 36.

When the first finger 68B is pulled, the parking lever 36 rotates about the pin screw 64, causing the parking lever 36 to approach the left grip section 26L. At this time, although the parking lever 36 approaches the left switch box 27L, the parking lever 36 is unlikely to interfere with the left switch box 27L because the first curved portion 47 protrudes forward and is recessed towards the rear. This makes it possible to fully swing the parking lever 36 until it approaches the left grip section 26L even if the left switch box 27L is large in size.

Figure 5:
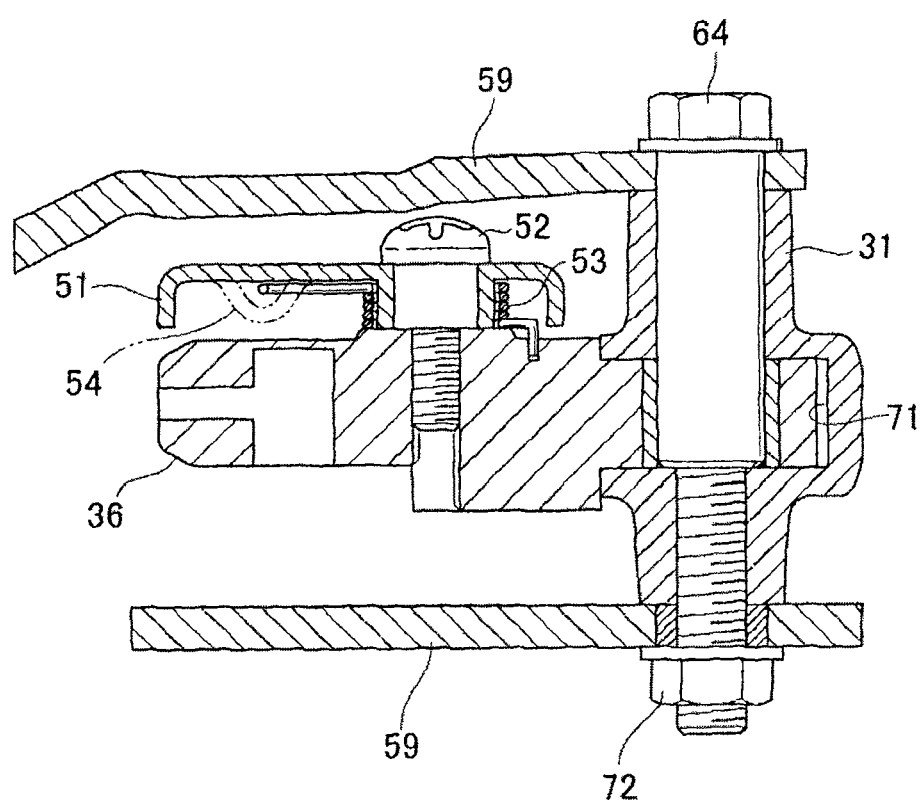
FIG. 5 is a sectional view along line 5-5 in FIG. 3.

As illustrated in FIG. 5, a recessed portion 71 is formed in the bracket main body 31 halfway along the height. The parking lever 36 is inserted into the recessed portion 71. The bracket main body 31 is pinched from top and bottom by the guard stay 59, and the pin screw 64 is inserted from top in this condition. A nut 72 is screwed onto the pin screw 64. This secures the guard stay 59 to the bracket main body 31. The parking lever 36 is supported by the bracket main body 31 and the pin screw 64 in a freely swingable manner.

Figure 6:
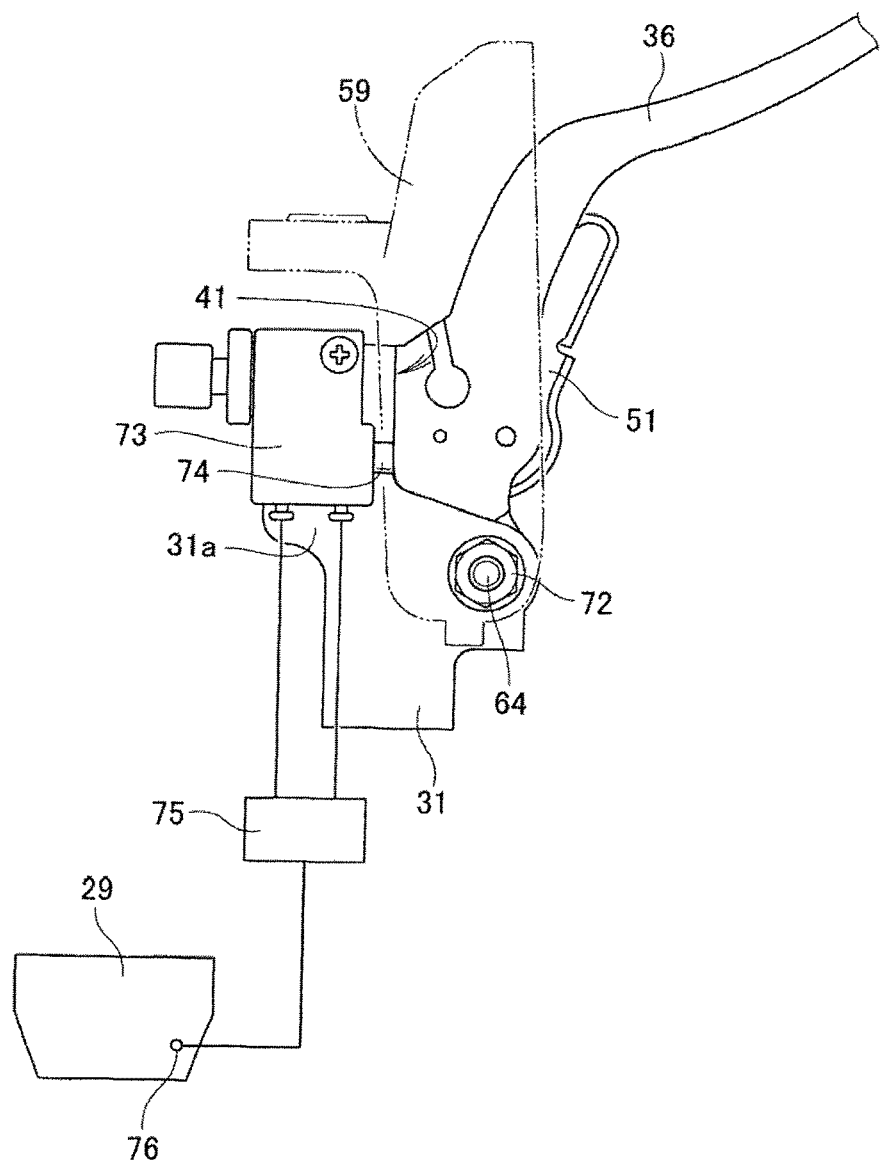
FIG. 6 is a bottom view of a bracket main body.

FIG. 6 is a bottom view of the bracket main body 31. A parking switch 73 is directly attached to a bottom face 31a of the bracket main body 31. This eliminates the need for an attachment and therefore contributes to a reduction in the number of parts as compared to the case wherein the parking switch 73 is attached to the handle bar 14 via an attachment.

In FIG. 6, the parking lever 36 is touching the receiving face 41, and a contact 74 of the parking switch 73 is pressed by the parking lever 36. The parking lever 36 is in a non-parking condition.

The switching signal of the parking switch 73 is sent to a relay section 75 which, for example, illuminates or extinguishes a parking brake lamp 76 provided on the meter case 29.

When the parking lever 36 is inactive, the parking brake lamp 76 is not illuminated.

When the parking lever 36 is pulled clockwise about the pin screw 64 in FIG. 6, the contact 74 protrudes. When the protrusion exceeds a given value, the switching signal is changed, illuminating the parking brake lamp 76. This makes it possible for the driver to visually recognize that the parking brake is applied.

Figure 7:
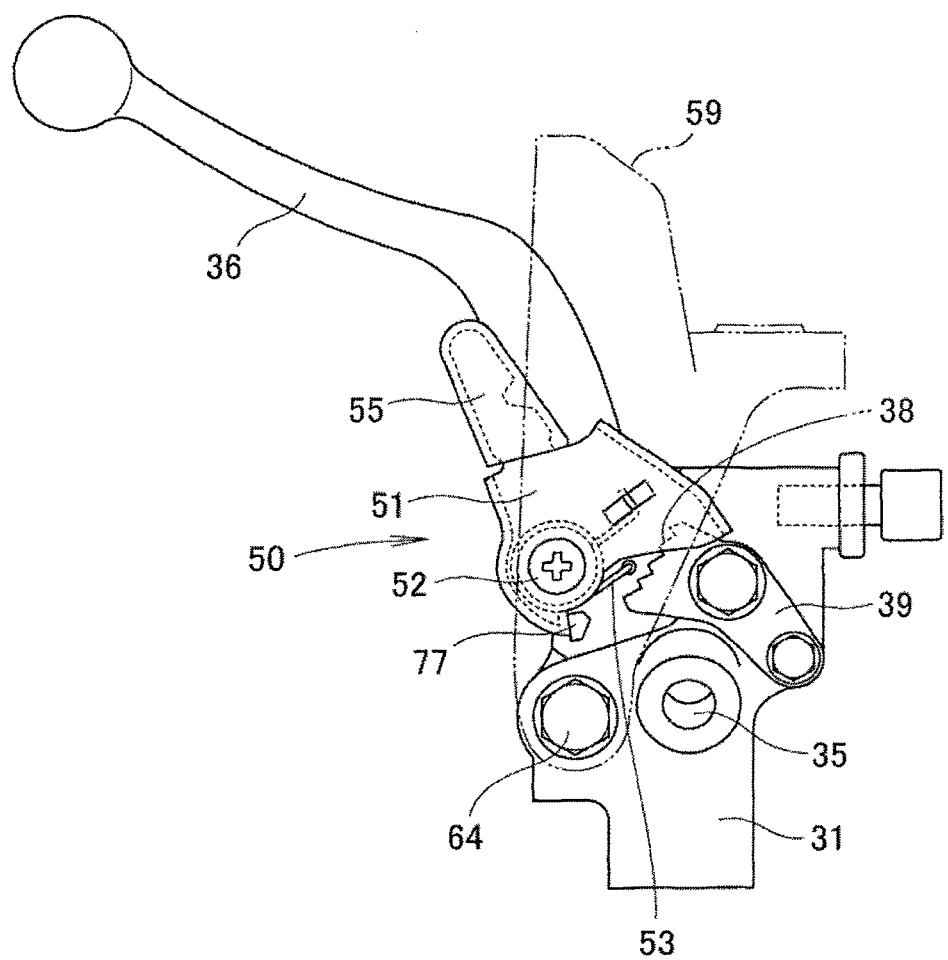
FIG. 7 is a configuration diagram of a lever lock mechanism.

As illustrated in FIG. 7, a lever lock mechanism 50 includes the stopper member 39, the lock lever 51, and the torsion spring 53. The stopper member 39 is provided on the bracket main body 31. The lock lever 51 and the torsion spring 53 are provided on the parking lever 36.

The torsion spring 53 biases the lock lever 51 counterclockwise about the screw 52. The counterclockwise rotation of the lock lever 51 is restricted by a stopper piece 77 touching the lock lever 51. The stopper piece 77 stands from the parking lever 36.

In FIG. 7, the lock lever 51 is not in engagement with the sawtooth section 38.

Figure 8A:
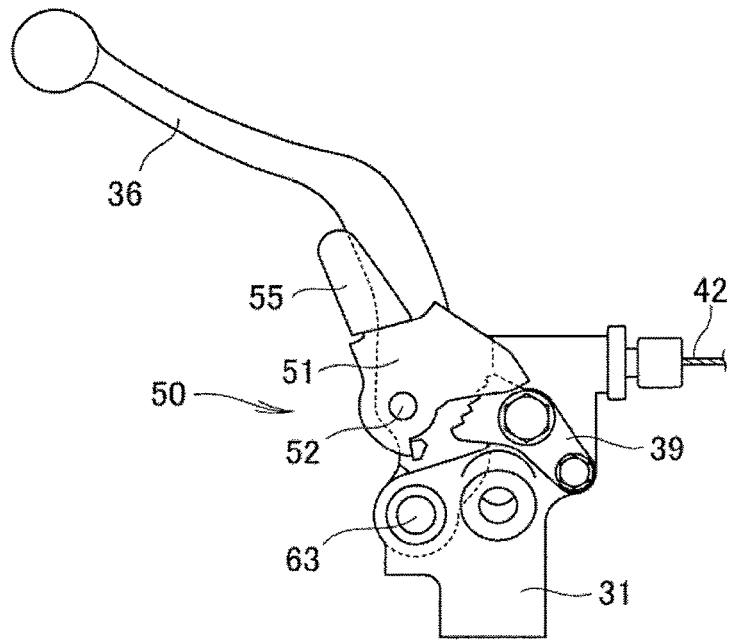
FIGS. 8(a) and 8(b) are working diagrams of the lever lock mechanism.
Figure 8B:
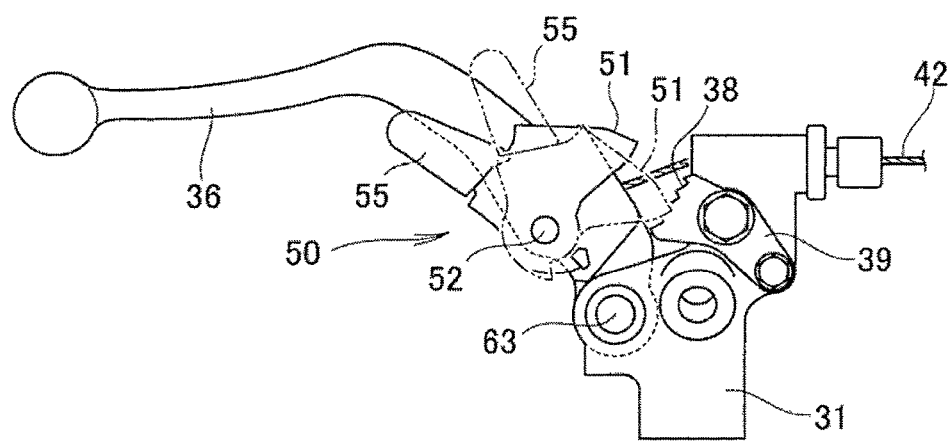

FIG. 8(a) illustrates non-parking condition. As illustrated in FIG. 8(b), the parking lever 36 is swung. The parking brake wire 42 is pulled by the parking lever 36. The tip of the parking brake wire 42 is connected to an arm 81 of a parking brake 80 shown in FIG. 9. When the arm 81 is swung, the parking brake 80 pinches a brake disk 82.

When the finger placement section 55 is pushed forward of the vehicle in FIG. 8(b), the lock lever 51 is swung as shown by an imaginary line. Next, when the parking lever 36 is swung back slightly, the lock lever 51 comes into engagement with the sawtooth section 38. Even if the finger is removed from the parking lever 36 in this condition, there is no concern that the parking lever 36 may return to the previous position. More specifically, the lever lock mechanism 50 maintains the parking lever 36 at the parking brake position.

It should be noted that the braking force can be selected as necessary by using the stopper member 39 having the sawtooth section 38.

In order to deactivate the parking brake 80, pull the parking lever 36 slightly in FIG. 8(b). As a result, the lock lever 51 shown by an imaginary line is detached from the sawtooth section 38 and returns to the position shown by the solid line thanks to the action of the torsion spring (reference numeral 53 in FIG. 7). From here onward, the lever lock mechanism 50 can be restored to the condition shown in FIG. 8(a) by loosening the parking lever 36.

It should be noted that the torsion spring 53 may act in the direction opposite to that in the present structure so that the lock lever 51 is pushed toward the stopper member 39, and so that as soon as the parking lever 36 is pulled, the lock lever 51 comes into engagement with the sawtooth section 38.

Figure 9:
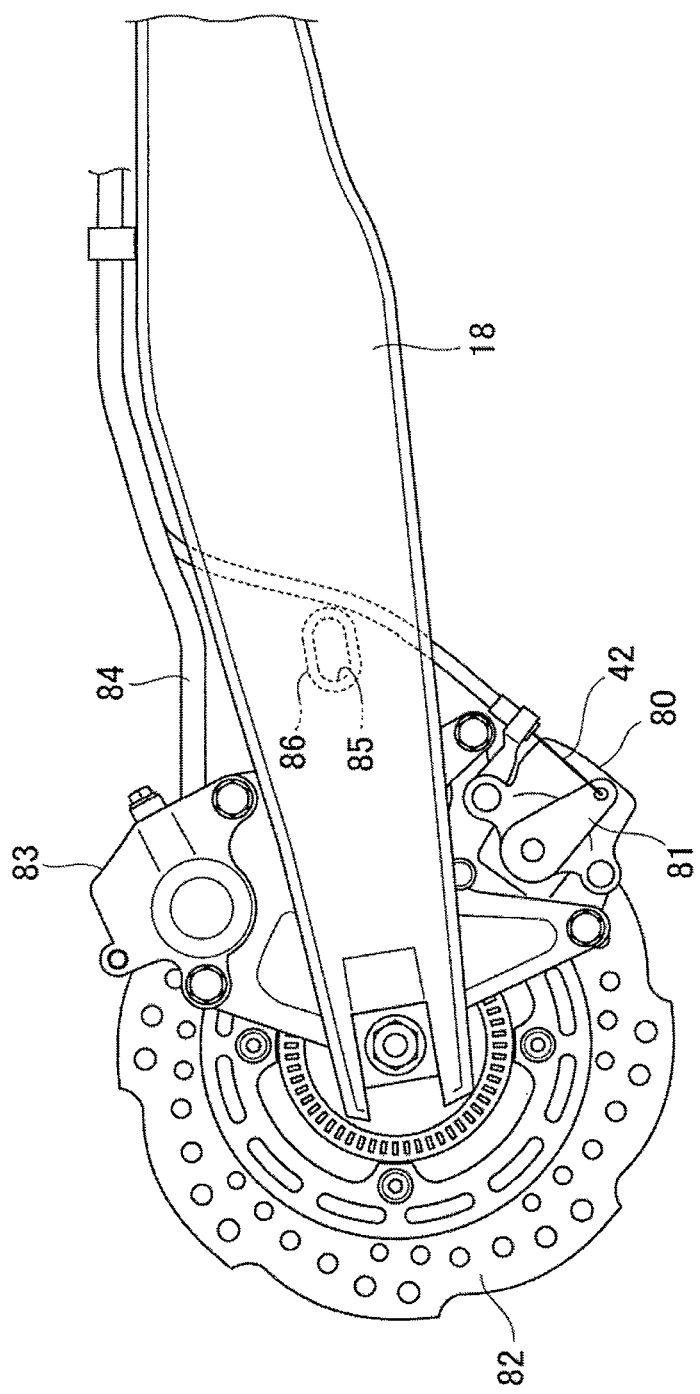
FIG. 9 is a right side view of a swing arm.

As illustrated in FIG. 9, a disk brake 83, a hydraulic brake device, is arranged upwardly relative to the swing arm 18 adapted to support the rear wheel 19, and the parking brake 80 is arranged downwardly relative to the swing arm 18. A hydraulic hose 84 is arranged along the upper side of the swing arm 18.

The parking brake wire 42 is arranged in such a manner so as to pass on the side of the vehicle body center of the swing arm 18. The parking brake wire 42 is protected by the swing arm 18. This also provides improved appearance.

The swing arm 18 is a hollow casting made of an aluminum alloy. A hole 85 through which casting sand is discharged remains on the face of the swing arm 18 on the side of the vehicle body center.

A rubber plug 86 is fitted in the hole 85. The parking brake wire 42 runs along the rubber plug 86.

Figure 10:
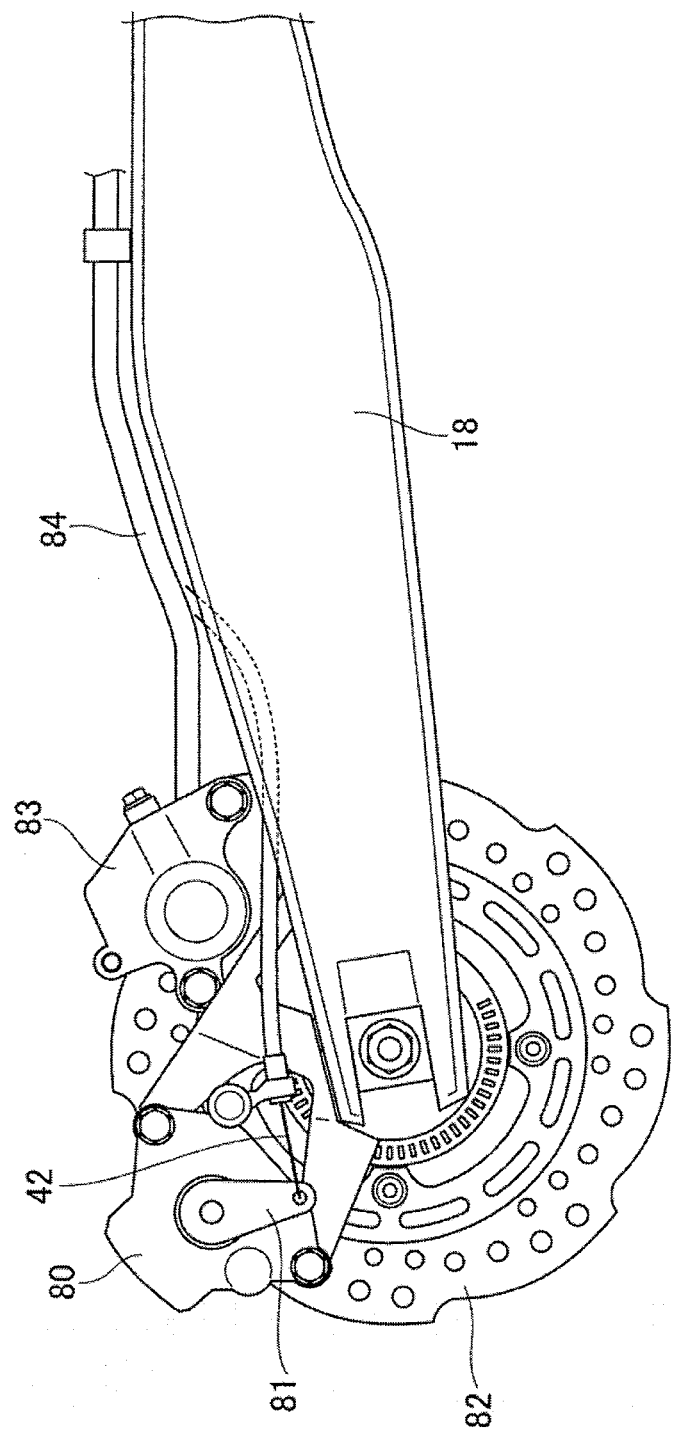
FIG. 10 is a right side view of another swing arm.

It should be noted that, as illustrated in FIG. 10, the parking brake 80 may be arranged upwardly relative to the swing arm 18. With this arrangement, the parking brake 80 is farther from the road surface, thus making it less likely that flying stones from the road surface may strike the parking brake 80, and that muddy water from the road surface may splash onto the parking brake 80.

It should be noted that although applied to a two-wheeled vehicle in the present embodiment, the present invention may also be applied to three- and four-wheeled vehicles.

Further, although attached to the left grip section in the present example, the parking operator may also be attached to the right grip section.

The present invention is suitable for application to a saddle type vehicle having two wheels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering handle bar for a saddle ride vehicle, comprising:
   a parking operator adapted to activate a parking brake during parking;
   a grip section positioned on an end portion of the handle bar, the grip section having a longitudinal axis and a distal end;
   a lever bracket operatively provided on a base portion of the grip section;
   a holding section operatively provided on an area of the lever bracket disposed toward a front portion of the handle bar;
   a parking lever serving as the parking operator, said parking lever being mounted on the holding section, the parking lever comprising:
   a first section having a first end directly connected to the holding section and a second end, the first section extending outwardly from the holding section so that the second end is further from the grip section than the first end, the first section extending along a first straight line extending between the first end and the second end of the first section; and
   a second section having a first end directly connected to the second end of the first section and a second end forming a distal end of the parking lever, the second section extending along a second straight line extending between the first end and the second end of the second section, the second section extending from the first section toward the grip section relative to the first straight line at an angle of more than 90 degrees from the first section and less than 90 degrees from the longitudinal axis of the grip section; and
   a knuckle visor arranged forward of the parking lever to protect the grip section, and one end of the knuckle visor is fastened to the lever bracket together with the parking lever,
   wherein the parking lever is housed in the knuckle visor.

2. The steering handle bar according to claim 1, wherein:
   a switch box is provided on the handle bar between the grip section and the lever bracket; and
   the parking lever has a curved portion to avoid interference with the switch box.

3. The steering handle bar according to claim 2, wherein:
   a lever lock mechanism is provided between the parking lever and the lever bracket to restrict the return of the parking lever when the parking brake is activated; and
   the lever lock mechanism includes a lock lever provided on the parking lever in a swingable manner and a stopper member provided on the lever bracket to engage with the lock lever.

4. The steering handle bar according to claim 2, wherein:
   a meter case is provided forward of the handle bar, and a parking switch is provided on the lever bracket to detect the position of the parking lever; and
   a parking brake lamp or an indicator adapted to show the parking status is provided on the meter case, and the parking brake lamp or the indicator is illuminated or goes out on the basis of information from the parking switch.

5. The steering handle bar according to claim 1, wherein:
   a lever lock mechanism is provided between the parking lever and the lever bracket to restrict the return of the parking lever when the parking brake is activated; and
   the lever lock mechanism includes a lock lever provided on the parking lever in a swingable manner and a stopper member provided on the lever bracket to engage with the lock lever.

6. The steering handle bar according to claim 5, wherein:
   a meter case is provided forward of the handle bar, and a parking switch is provided on the lever bracket to detect the position of the parking lever; and
   a parking brake lamp or an indicator adapted to show the parking status is provided on the meter case, and the parking brake lamp or the indicator is illuminated or goes out on the basis of information from the parking switch.

7. The steering handle bar according to claim 1, wherein:
   a meter case is provided forward of the handle bar, and a parking switch is provided on the lever bracket to detect the position of the parking lever; and
   a parking brake lamp or an indicator adapted to show the parking status is provided on the meter case, and the parking brake lamp or the indicator is illuminated or goes out on the basis of information from the parking switch.

8. A steering handle bar for a saddle ride vehicle, comprising:
   a grip section positioned on an end portion of the handle bar, the grip section having a longitudinal axis and a distal end;
   a lever bracket operatively provided on a base portion of the grip section;
   a holding section operatively provided on an area of the lever bracket disposed toward a front portion of the handle bar; and
   a parking lever operatively connected for activating a parking brake, said parking lever being mounted on the holding section and arranged longitudinally away from the grip section, the parking lever comprising:

a first section having a first end directly connected to the holding section and a second end, the first section extending outwardly from the holding section so that the second end is further from the grip section than the first end, the first section extending along a first straight line extending between the first end and the second end of the first section; and a second section extending from the first section toward the grip section relative to the first straight line at an angle of more than 90 degrees from the first section, the second section having a first end directly connected to the second end of the first section and a second end forming a distal end of the parking lever, the second section extending along a second straight line extending between the first end and the second end of the second section, wherein the parking lever has a first position in which the second section is at angle of less than ninety degrees with the longitudinal axis of the grip section and a second position in which the second section is parallel with the longitudinal axis of the grip section.

9. The steering handle bar according to claim 8, wherein:
a switch box is provided on the handle bar between the grip section and the lever bracket; and
the parking lever has a curved portion to avoid interference with the switch box.

10. The steering handle bar according to claim 9, wherein:
a lever lock mechanism is provided between the parking lever and the lever bracket to restrict the return of the parking lever when the parking brake is activated; and
the lever lock mechanism includes a lock lever provided on the parking lever in a swingable manner and a stopper member provided on the lever bracket to engage with the lock lever.

11. The steering handle bar according to claim 9, wherein a knuckle visor is arranged forward of the parking lever to protect the grip section, and one end of the knuckle visor is fastened to the lever bracket together with the parking lever.

12. The steering handle bar according to claim 9, wherein:
a meter case is provided forward of the handle bar, and a parking switch is provided on the lever bracket to detect the position of the parking lever; and
a parking brake lamp or an indicator adapted to show the parking status is provided on the meter case, and the parking brake lamp or the indicator is illuminated or goes out on the basis of information from the parking switch.

13. The steering handle bar according to claim 8, wherein:
a lever lock mechanism is provided between the parking lever and the lever bracket to restrict the return of the parking lever when the parking brake is activated; and
the lever lock mechanism includes a lock lever provided on the parking lever in a swingable manner and a stopper member provided on the lever bracket to engage with the lock lever.

14. The steering handle bar according to claim 13, wherein a knuckle visor is arranged forward of the parking lever to protect the grip section, and one end of the knuckle visor is fastened to the lever bracket together with the parking lever.

15. The steering handle bar according to claim 8, wherein a knuckle visor is arranged forward of the parking lever to protect the grip section, and one end of the knuckle visor is fastened to the lever bracket together with the parking lever.

16. The steering handle bar according to claim 8, wherein:
a meter case is provided forward of the handle bar, and a parking switch is provided on the lever bracket to detect the position of the parking lever; and
a parking brake lamp or an indicator adapted to show the parking status is provided on the meter case, and the parking brake lamp or the indicator is illuminated or goes out on the basis of information from the parking switch.

* * * * *